(12) United States Patent
Deng

(10) Patent No.: US 12,306,522 B2
(45) Date of Patent: May 20, 2025

(54) ILLUMINATION DEVICE AND PROJECTION DEVICE

(71) Applicant: Coretronic Corporation, Hsin-Chu (TW)

(72) Inventor: Yu-Hsiang Deng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 392 days.

(21) Appl. No.: 17/896,102

(22) Filed: Aug. 26, 2022

(65) Prior Publication Data

US 2023/0062120 A1 Mar. 2, 2023

(30) Foreign Application Priority Data

Aug. 27, 2021 (CN) .......................... 202122039898.1

(51) Int. Cl.
G03B 21/20 (2006.01)

(52) U.S. Cl.
CPC ..... *G03B 21/2046* (2013.01); *G03B 21/2033* (2013.01); *G03B 21/2066* (2013.01)

(58) Field of Classification Search
CPC ............ G03B 21/2046; G03B 21/2033; G03B 21/2066; G03B 21/204; G03B 33/08
USPC .......................................................... 353/85
See application file for complete search history.

(56) References Cited

U.S. PATENT DOCUMENTS

| | | | | |
|---|---|---|---|---|
| 2018/0239233 A1* | 8/2018 | Kado | ................... | G03B 21/204 |
| 2019/0215498 A1* | 7/2019 | Chung | ................. | G03B 21/204 |
| 2019/0331995 A1* | 10/2019 | Chen | ..................... | G02B 5/0205 |
| 2019/0384149 A1* | 12/2019 | Tsai | ..................... | G03B 21/2066 |
| 2019/0384150 A1* | 12/2019 | Tsai | ....................... | G03B 21/16 |
| 2022/0128893 A1* | 4/2022 | Hsieh | ..................... | G03B 33/08 |
| 2022/0171277 A1* | 6/2022 | Hsieh | ................. | G03B 21/2033 |

FOREIGN PATENT DOCUMENTS

| | | |
|---|---|---|
| CN | 103376634 | 10/2013 |
| CN | 111736416 | 10/2020 |

* cited by examiner

*Primary Examiner* — Magda Cruz
(74) *Attorney, Agent, or Firm* — JCIPRNET

(57) ABSTRACT

An illumination device including a laser light source, a first wavelength selective element, and a wavelength conversion element is provided. The laser light source provides a laser beam. The first wavelength selective element has different transmittances for the laser beam incident at different angles. In a first mode of the illumination device, the laser beam is incident on the first wavelength selective element at a first angle, and the laser beam is reflected by the first wavelength selective element. In a second mode of the illumination device, the laser beam is incident on the first wavelength selective element at a second angle greater than the first angle, and the laser beam penetrates the first wavelength selective element. The wavelength conversion element converts the laser beam into a first converted light beam. A projection device using the illumination device is also provided.

16 Claims, 7 Drawing Sheets

ILLUMINATION DEVICE AND PROJECTION DEVICE

CROSS-REFERENCE TO RELATED APPLICATION

This application claims the priority benefit of China application serial no. 202122039898.1, filed on Aug. 27, 2021. The entirety of the above-mentioned patent application is hereby incorporated by reference herein and made a part of this specification.

BACKGROUND

Technical Field

The disclosure relates to an optical device, and in particular to an illumination device and a projection device using the illumination device.

Description of Related Art

With the development of science and technology, solid state illumination (SSI) such as light emitting diode (LED) and laser light source have been widely used in the light source required by a projection device. A solid light source, based on the luminous spectrum thereof, is suitable for being used as a light source of a projection device. Therefore, the light source required for a projecting an image may be provided by exciting a wavelength conversion material (such as phosphor). However, in order to apply both a beam emitted from the solid light source and a beam converted by the wavelength conversion material as beams required for projecting an image, the solid light source and the wavelength conversion material need additional light combining elements and optical elements such as lenses, field lenses, and reflectors to adjust an appropriate optical transmission path. Therefore, conventionally, an illumination system required by a projection device has a complicated architecture and poor layout, and optical elements required for the illumination system, such as a condensing lens, need to have a relatively large volume.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination device and a projection device using the illumination device. The illumination device achieves a light combining effect without sacrificing the quality of a converted beam. The disclosure provides an illumination device and a projection device having small volumes and requiring a low cost.

Other objectives and advantages of the disclosure may be further understood from the technical features disclosed in the disclosure.

In order to achieve one or part or all of the above-mentioned objectives or other objectives, the disclosure provides an illumination device including a laser light source, a first wavelength selective element, and a wavelength conversion element. The laser light source is used to provide a laser beam. The first wavelength selective element is disposed on a transmission path of the laser beam. The first wavelength selective element has different transmittances for the laser beam incident at different angles. In a first mode of the illumination device, the laser beam is incident on the first wavelength selective element at a first angle, and the laser beam is reflected by the first wavelength selective element. In a second mode of the illumination device, the laser beam is incident on the first wavelength selective element at a second angle greater than the first angle, and the laser beam penetrates the first wavelength selective element. The wavelength conversion element is disposed on the transmission path of the laser beam. The wavelength conversion element is used to convert the laser beam into a first converted light beam.

In order to achieve one or part or all of the above-mentioned objectives or other objectives, the disclosure provides a projection device including an illumination device, a light valve, and a projection lens. The illumination device is used to provide an illumination beam. The illumination device includes a laser light source, a first wavelength selective element, and a wavelength conversion element. The laser light source is used to provide a laser beam. The first wavelength selective element is disposed on a transmission path of the laser beam, and the first wavelength selective element has different transmittances for the laser beam incident on different angles. In a first mode of the illumination device, the laser beam is incident on the first wavelength selective element at a first angle, and the laser beam is reflected by the first wavelength selective element. In a second mode of the illumination device, the laser beam is incident on the first wavelength selective element at a second angle greater than the first angle, and the laser beam penetrates the first wavelength selective element. The wavelength conversion element is disposed on the transmission path of the laser beam, and the wavelength conversion element is used to convert the laser beam into a first converted light beam. The illumination beam includes the laser beam and the first converted light beam. The light valve is disposed on the transmission path of the illumination beam. The light valve is used to convert the illumination beam into an image beam. The projection lens is disposed on a transmission path of the image beam. The projection lens is used to project the image beam out of the projection device.

Based on the above, the embodiment of the disclosure at least has one of the following advantages or effects. In the illumination device and the projection device of the disclosure, by allowing the laser beam to be incident on the first wavelength selective element at different angles in different modes, the laser beam is controlled to respectively penetrate the first wavelength selective element or be reflected by the first wavelength selective element. Accordingly, the laser beam or the first converted light beam converted by the wavelength conversion element is output in different modes, and the illumination beam of different colored lights is obtained without a polarization splitting prism needed, thereby reducing costs and device volume. In addition, the first converted light beam, compared with in other architectures, has better uniformity and layout.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIG.(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1:
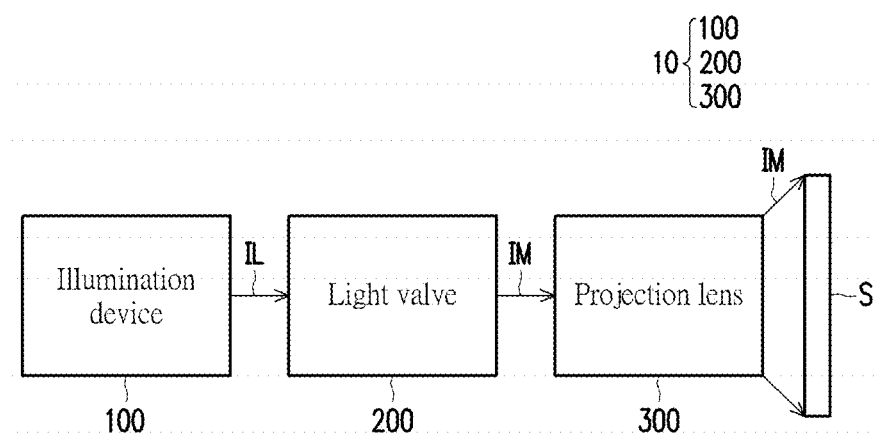
FIG. 1 is a schematic view of a projection device according to an embodiment of the disclosure.

FIG. 1 is a schematic view of a projection device according to an embodiment of the disclosure. Referring to FIG. 1, a projection device 10, such as a projector, includes an illumination device 100, a light valve 200, and a projection lens 300. The illumination device 100 is used to provide an illumination beam IL. The light valve 200 is disposed on a transmission path of the illumination beam IL. The light valve 200 is used to convert the illumination beam IL into an image beam IM with image information. The light valve 200 is, for example, a reflective liquid crystal on silicon (LCOS) or a digital micro-mirror device (DMD), and a transparent liquid crystal panel. The projection lens 300 is disposed on a transmission path of the image beam IM. The projection lens 300 is used to project the image beam IM out of the projection device 10. The projection lens 300 may, for example, project the image beam IM to a projection target S, and the projection target S may be, for example, a screen or a wall surface. The projection lens 300 includes, for example, a combination of one or more optical lenses with refractive power, including, for example, various combinations of non-planar lenses including a biconcave lens, a biconvex lens, a concave-convex lens, a convex-concave lens, a plano-convex lens, and a plano-concave lens. In an embodiment, the projection lens 300 may further include a planar optical lens. The disclosure does not limit the type of the projection lens 300.

Figure 2A:
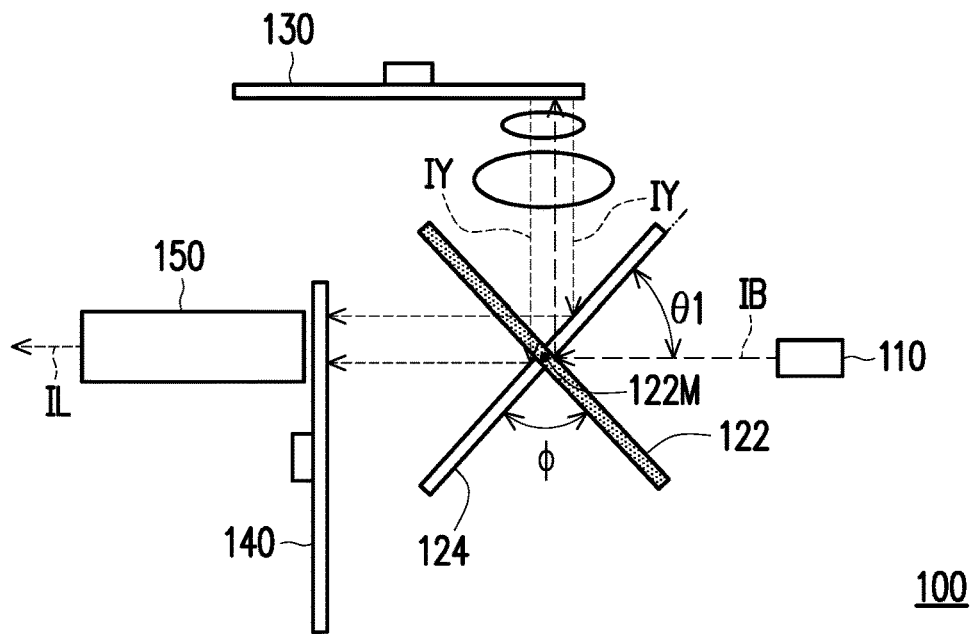
FIGS. 2A and 2B are schematic views of aspects of an illumination device in different modes according to an embodiment of the disclosure.
Figure 2B:
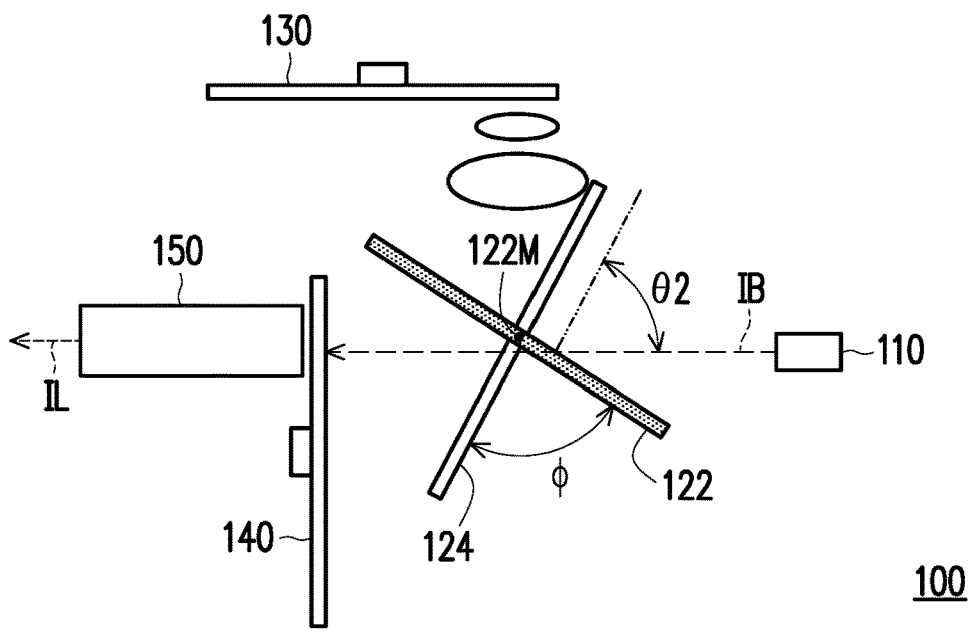
Figure 3A:
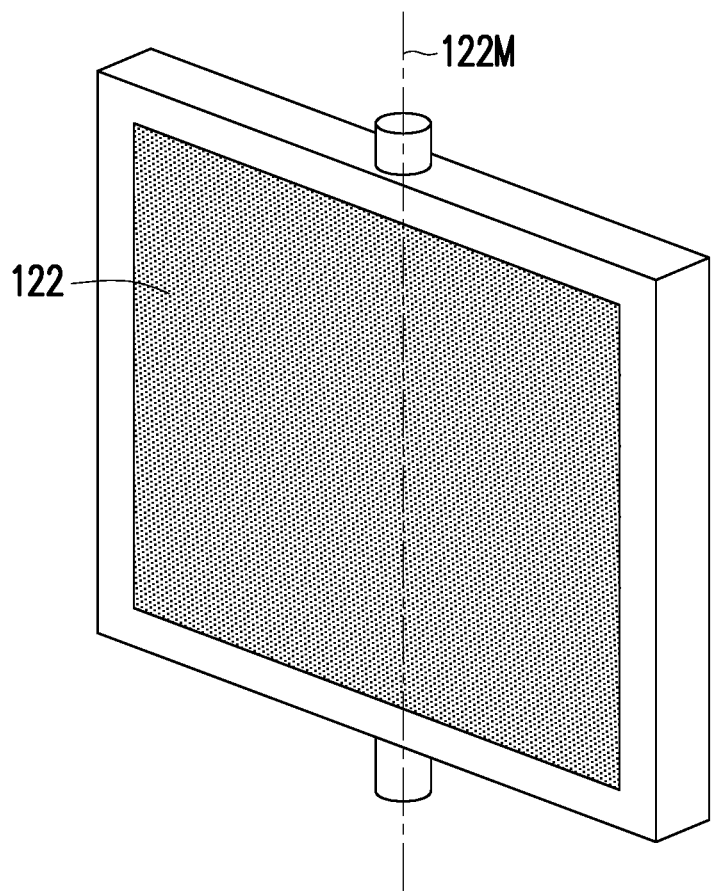
FIG. 3A is a schematic perspective view of a first wavelength selective element according to an embodiment of the disclosure.
Figure 3B:
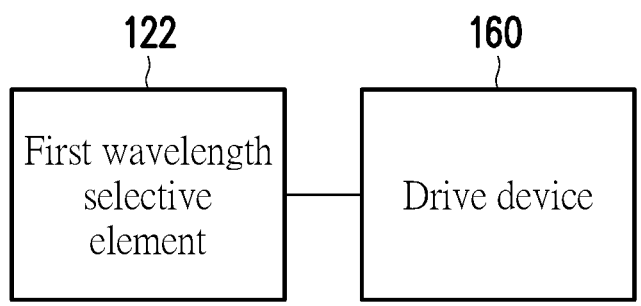
FIG. 3B is a schematic diagram of an architecture of the first wavelength selective element of FIG. 3A.
Figure 4:
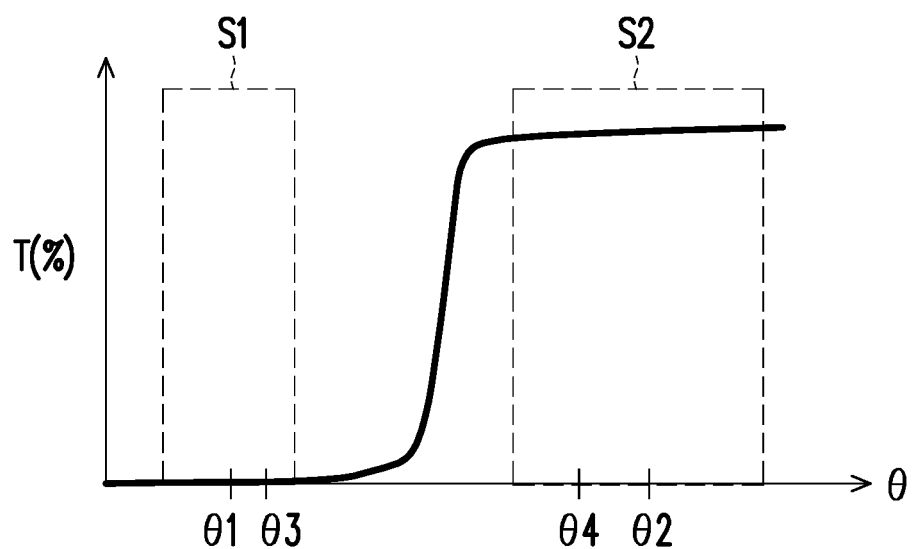
FIG. 4 shows a schematic diagram of a relationship between a transmittance and a light incident angle of a first wavelength selective element according to an embodiment of the disclosure.

FIGS. 2A and 2B are schematic views of aspects of an illumination device in different modes according to an embodiment. FIG. 3A is a schematic perspective view of a first wavelength selective element according to an embodiment. FIG. 3B is a schematic diagram of an architecture of the first wavelength selective element of FIG. 3A. FIG. 4 shows a schematic diagram of a relationship between a transmittance and a light incident angle of a first wavelength selective element according to an embodiment.

FIG. 2A shows the aspect of the illumination device 100 in a first mode. FIG. 2B shows the aspect of the illumination device 100 in a second mode. Referring to FIG. 2A, the illumination device 100 includes a laser light source 110, a first wavelength selective element 122, a second wavelength selective element 124, a wavelength conversion element 130, a filter module 140, and a light homogenizing element 150. The laser light source 110 is used to provide a laser beam IB. In this embodiment, the laser light source 110 is a blue laser light source, and the laser beam IB is a blue laser beam, but the disclosure is not limited thereto. In this embodiment, the laser light source 110 may include a plurality of blue laser diodes arranged in at least one array, but the disclosure is not limited thereto.

The first wavelength selective element 122 and the second wavelength selective element 124 are, for example, dichroic mirrors. The wavelength conversion element 130 is used to convert the laser beam IB into a first converted light beam IY. In this embodiment, the wavelength conversion element 130 has a wavelength conversion material. For example, the wavelength conversion material includes a phosphor that may generate a yellow beam; the laser beam IB is irradiated to the wavelength conversion material (for example, phosphor), and the wavelength conversion material is excited to emit the yellow beam, but the disclosure is not limited thereto. In some embodiments, the wavelength conversion element 130 is a phosphor wheel; the phosphor wheel has a circular metal substrate, and the wavelength conversion material is formed as an O-ring on the circular metal substrate.

Referring to FIGS. 2A, 3A and 3B, the first wavelength selective element 122 is disposed on a transmission path of the laser beam IB. The first wavelength selective element 122 has a first rotating axis 122M. The first wavelength selective element 122 is used to rotate around the first rotating axis 122M. For example, as shown in FIG. 3A, the first wavelength selective element 122 may be disposed in a frame, and the first wavelength selective element 122 and the frame rotate around the first rotating axis 122M together, but the disclosure is not limited thereto. In this embodiment, as shown in FIG. 3B, the illumination device 100 may further include a drive device 160. The first wavelength selective element 122 is electrically connected to the drive device 160, and the drive device 160 may drive the first wavelength selective element 122 to rotate (oscillate) around the first rotating axis 122M. In some embodiments, the drive device 160 may include a motor and a control device, and the control device may control the motor according to a preset mode to drive the first wavelength selective element 122 to oscillate.

FIG. 4 shows the schematic view of the relationship between the transmittance and the light incident angle of the first wavelength selective element 122 relative to the laser beam IB. The light incident angle is, for example, an angle between an incident direction of the laser beam IB and a normal direction of the first wavelength selective element 122. Referring to FIG. 4, the first wavelength selective element 122 has different transmittances for the laser beam IB incident at different angles. For example, a main wavelength of the laser beam IB is 470 nm. When the laser beam IB is incident on the first wavelength selective element 122 at a smaller light incident angle (for example, a first angle θ1 or a third angle θ3), the value of the transmittance is low, and most of the laser beam IB is reflected by the first wavelength selective element 122, and this section is called a reflection section S1 of FIG. 4 (transmission characteristic). When the laser beam IB is incident on the first wavelength selective element 122 at a larger light incident angle (for example, a second angle θ2 or a fourth angle θ4), most of the laser beam IB passes through the first wavelength selective element 122, and this section is called a transmission section S2 of FIG. 4. The angle of the first angle θ1 or the third angle θ3 is smaller than the angle of the second angle θ2 or the fourth angle θ4. In addition, the first wavelength selective element 122 is used to allow the first converted light beam IY to pass through. Such features of the first wavelength selective element 122 may be achieved by using methods known to those skilled in the art, such as coating the surface of the first wavelength selective element 122. The relationship diagram in FIG. 4 is only an example of the first wavelength selective element 122. The first angle θ1, the second angle θ2, the third angle θ3, and the fourth angle θ4 may be any value in the range of 0 degrees to 90 degrees, and the disclosure is not limited thereto.

Referring to FIG. 2A again, the second wavelength selective element 124 is used to allow the laser beam IB to pass through and reflect the first converted light beam IY. Such features of the second wavelength selective element 124 may be achieved by using methods known to those skilled in the art, such as coating the surface of the second wavelength selective element 124. In this embodiment, the first wavelength selective element 122 and the second wavelength selective element 124 are disposed as an "X-shaped" structure, so that there is a fixed included angle (to (for example, 90 degrees) between the first wavelength selective element 122 and the second wavelength selective element 124 (as shown in FIGS. 2A and 2B). In this embodiment, the second wavelength selective element 124 and the first wavelength selective element 122 may oscillate around the first rotating axis 122M together.

As shown in FIG. 2A, in the first mode of the illumination device 100, the laser beam IB is incident on the first wavelength selective element 122 at the first angle θ1, so that the laser beam IB is reflected by the first wavelength selective element 122 (the reflection ratio is greater than 50%). The wavelength conversion element 130 is disposed on the transmission path of the laser beam IB reflected by the first wavelength selective element 122. In this embodiment, part of the laser beam IB passes through the second wavelength selective element 124 and is reflected by the first wavelength selective element 122 to be transmitted to the wavelength conversion element 130. In some embodiments, a lens or a lens combination may further be disposed on the transmission path of the laser beam IB, so that the laser beam IB may be incident on the wavelength conversion element 130 after being focused by the lens or the lens combination, so that the laser beam IB may be incident on the wavelength conversion element 130 at a smaller incident angle. Therefore, the volume of the lens or the lens combination may be reduced, and the first converted light beam IY that is obtained has better uniformity and distribution.

The wavelength conversion element 130 converts the laser beam IB into the first converted light beam IY. As shown in FIG. 2A, the first converted light beam IY from the wavelength conversion element 130 may first pass through the first wavelength selective element 122 and then be reflected by the second wavelength selective element 124. Alternatively, the first converted light beam IY from the wavelength conversion element 130 may be reflected by the second wavelength selective element 124 first and then pass through the first wavelength selective element 122.

The light homogenizing element 150 is disposed on a transmission path of the first converted light beam IY. The first converted light beam IY reflected by the second wavelength selective element 124 may be transmitted to the light homogenizing element 150. In this embodiment, the light homogenizing element 150 includes a rod or a lens array. The lens array is, for example, a fly-eye lens array, but the disclosure is not limited thereto. When the first converted light beam IY is transmitted to the light homogenizing element 150, the light homogenizing element 150 may homogenize the first converted light beam IY. In the first mode (i.e., first period) of the illumination device 100 as shown in FIG. 2A, the light homogenizing element 150 outputs the first converted light beam IY (homogenized) to the light valve 200 of the projection device 10.

The illumination device 100 may further include the filter module 140, and the filter module 140 is disposed between the second wavelength selective element 124 and the light homogenizing element 150. The filter module 140 is located on the transmission path of the first converted light beam IY. The filter module 140 is used to adjust the wavelength of the first converted light beam IY. The filter module 140 may be, for example, a filtering color wheel, which has a plurality of coating areas corresponding to different wavelengths to filter out unnecessary wavelength beams in each area to obtain a desired wavelength beam. For example, a red filter area only allows a red beam in the first converted light beam IY to pass through, and a green filter area only allows a green beam in the first converted light beam IY to pass through.

As shown in FIGS. 2A and 2B, when the illumination device 100 is switched from the first mode to the second mode (i.e., second period), the first wavelength selective element 122 rotates around the first rotating axis 122M. In some embodiments, the included angle D between the first wavelength selective element 122 and the second wavelength selective element 124 is fixed. Referring to FIG. 2B, in the second mode of the illumination device 100, the laser beam IB is incident on the first wavelength selective element 122 at the second angle θ2 greater than the first angle θ1, so that the laser beam IB penetrates the first wavelength selective element 122 (the transmittance is greater than 50%). As shown in FIG. 2B, after penetrating the first wavelength selective element 122, the laser beam IB penetrates the second wavelength selective element 124 and is transmitted to the light homogenizing element 150. In this embodiment, in the second mode, the laser beam IB is not incident on the wavelength conversion element 130, and a reflection area is not required to be disposed in the wavelength conversion element 130 to receive the laser beam IB. Accordingly, a simpler structure of the wavelength conversion element 130 may be achieved, the assembly cost may be reduced, and the energy accumulated on the wavelength conversion element 130 may be more easily dissipated.

In the second mode, when the laser beam IB is transmitted to the light homogenizing element 150, the light homogenizing element 150 may homogenize the laser beam IB. In the second mode of the illumination device 100 as shown in FIG. 2B, the filter module 140 is disposed on the transmission path of the laser beam IB. The light homogenizing element 150 outputs the laser beam IB to the light valve 200 of the projection device 10. Specifically, the laser beam IB may penetrate the corresponding penetration area in the filter module 140 first and then be transmitted to the light homogenizing element 150. In the first mode and the second mode, the first converted light beam IY and the laser beam IB that pass through the light homogenizing element 150 in sequence are defined as the illumination beam IL. The illumination beam IL includes at least one of the first converted light beam IY and the laser beam IB.

Figure 5A:
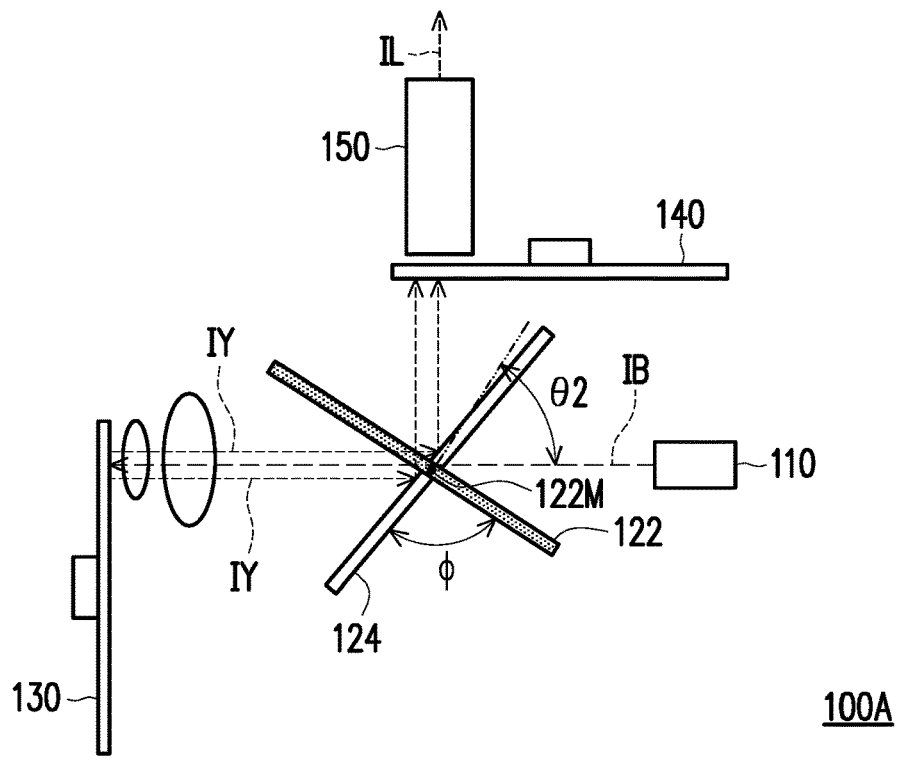
FIGS. 5A and 5B are schematic views of aspects of an illumination device in different modes according to another embodiment of the disclosure.
Figure 5B:
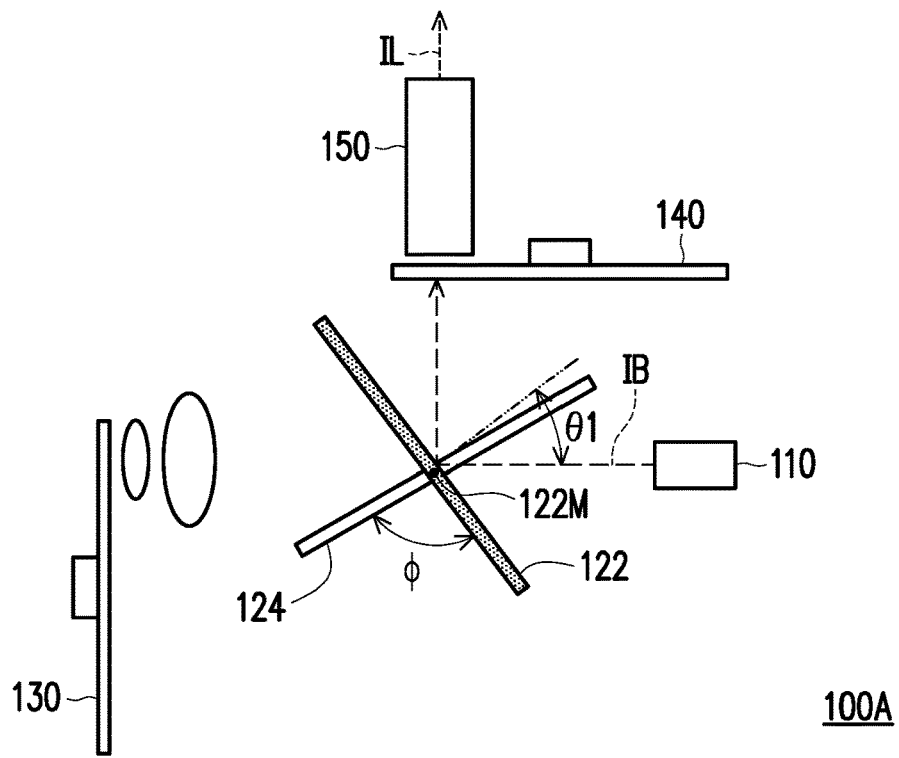

FIGS. 5A and 5B are schematic views of aspects of an illumination device 100A in different modes according to another embodiment of the disclosure. FIG. 5A shows the aspect of the illumination device 100A in the first mode. FIG. 5B shows the aspect of the illumination device 100A in the second mode. Referring to FIG. 5A, the illumination device 100A of the embodiment in FIGS. 5A and 5B is similar to the illumination device 100 in FIGS. 2A and 2B, and the differences are as follows.

In the first mode of the illumination device 100A, the laser beam IB is incident on the first wavelength selective element 122 at the second angle θ2 greater than the first angle θ1, so that the laser beam IB penetrates the first wavelength selective element 122 (the transmittance is greater than 50%, or greater than 80%). As shown in FIG. 5A, part of the laser beam IB may penetrate the second wavelength selective element 124 first and then penetrate the first wavelength selective element 122.

The wavelength conversion element 130 is disposed on the transmission path of the laser beam IB, the laser beam IB is transmitted to the wavelength conversion element 130 after penetrating the first wavelength selective element 122. The wavelength conversion element 130 converts the laser beam IB into the first converted light beam IY. As shown in FIG. 5A, part of the first converted light beam IY from the wavelength conversion element 130 may penetrate the first wavelength selective element 122 first and then be reflected by the second wavelength selective element 124. Part of the first converted light beam IY from the wavelength conversion element 130 may be reflected by the second wavelength selective element 124 first and then penetrate the first wavelength selective element 122. As shown in FIG. 5A, next, the first converted light beam IY is transmitted to the filter module 140 and the light homogenizing element 150. In the first mode of the illumination device 100A as shown in FIG. 5A, the light homogenizing element 150 outputs the first converted light beam IY (homogenized) to the light valve 200 of the projection device 10.

In the second mode of the illumination device 100A, the laser beam IB is incident on the first wavelength selective element 122 at the first angle θ1, so that the laser beam IB is reflected by the first wavelength selective element 122 (the reflection ratio is greater than 50%, or greater than 80%). As shown in FIG. 5B, the filter module 140 and the light homogenizing element 150 are disposed on the transmission path of the laser beam IB reflected by the first wavelength selective element 122. Part of the laser beam IB may penetrate the second wavelength selective element 124 first and then be reflected by the first wavelength selective element 122 to be transmitted to the filter module 140 and the light homogenizing element 150.

In the second mode of the illumination device 100A as shown in FIG. 5B, the light homogenizing element 150 outputs the laser beam IB (homogenized) to the light valve 200 of the projection device 10.

Figure 6A:
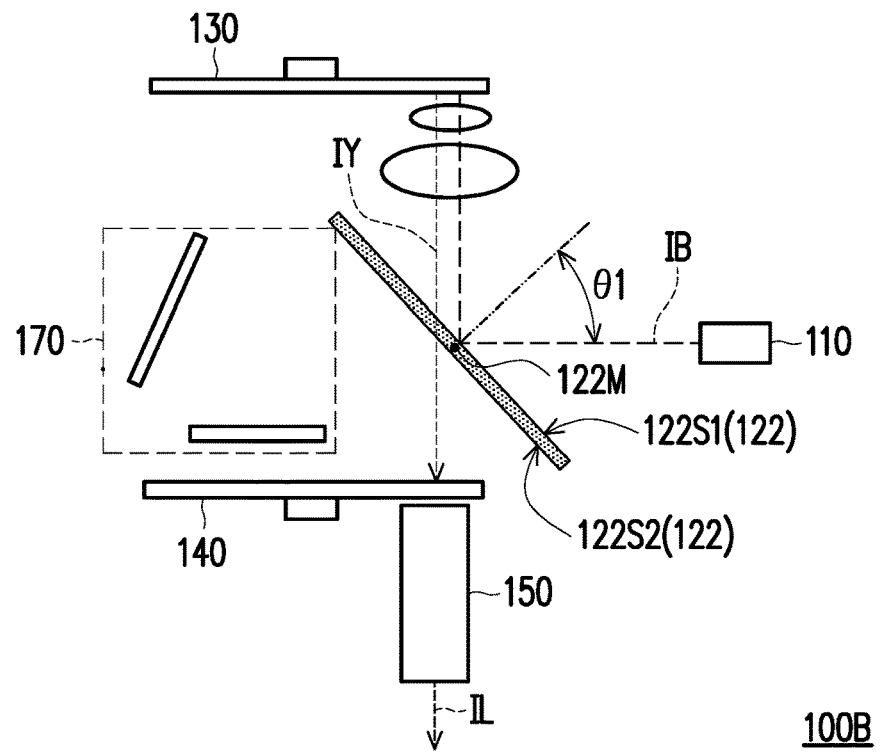
FIGS. 6A and 6B are schematic views of aspects of an illumination device in different modes according to another embodiment of the disclosure.
Figure 6B:
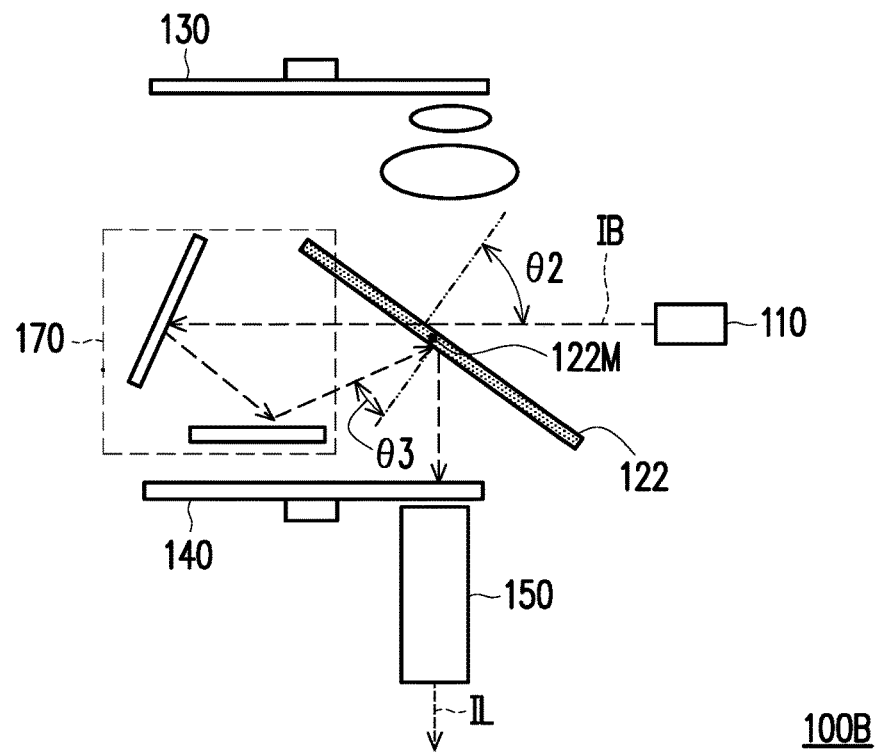

FIGS. 6A and 6B are schematic views of aspects of an illumination device 100B in different modes according to another embodiment of the disclosure. FIG. 6A shows the aspect of the illumination device 100B in the first mode. FIG. 6B shows the aspect of the illumination device 100B in the second mode. Referring to FIG. 6A, the illumination device 100B of the embodiment in FIGS. 6A and 6B is similar to the illumination device 100 in FIGS. 2A and 2B, and the differences are as follows.

In the illumination device 100B, the second wavelength selective element 124 (as shown in FIG. 2A) is not required to be disposed in the illumination device 100B. The first wavelength selective element 122 may include a first surface 122S1 where the laser beam IB is incident and a second surface 122S2 opposite to the first surface 122S1. The first surface 122S1 and the second surface 122S2 of the first wavelength selective element 122 are used to allow the first converted light beam IY to pass through. Such features of the first wavelength selective element 122 may be achieved by using methods known to those skilled in the art, such as coating the surface of the first wavelength selective element 122.

In the first mode of the illumination device 100B, the laser beam IB is incident on the first wavelength selective element 122 (for example, the first surface 122S1) at the first angle θ1, so that the laser beam IB is reflected by the first wavelength selective element 122 (the reflection ratio is greater than 50%). The wavelength conversion element 130 is disposed on the transmission path of the laser beam IB reflected by the first wavelength selective element 122. In some embodiments, a lens or a lens combination may further be disposed on the transmission path of the laser beam IB, so that the laser beam IB may be incident on the wavelength conversion element 130 after being focused by the lens or the lens combination.

The wavelength conversion element 130 converts the laser beam IB into the first converted light beam IY. As shown in FIG. 6A, the first converted light beam IY from the wavelength conversion element 130 may penetrate the first surface 122S1 and the second surface 122S2 of the first wavelength selective element 122 to be transmitted the filter module 140 and the light homogenizing element 150. In the first mode of the illumination device 100B as shown in FIG. 6A, the light homogenizing element 150 outputs the first converted light beam IY to the light valve 200 of the projection device 10.

In the second mode of the illumination device 100B, the laser beam IB is incident on the first wavelength selective element 122 (for example, the first surface 122S1) at the second angle θ2 greater than the first angle θ1, so that the laser beam IB penetrates the first wavelength selective element 122 (the transmittance is greater than 50%).

As shown in FIG. 6B, in this embodiment, the illumination device 100B may further include a reflective element set 170. The reflective element set 170 includes one or more reflective elements having one or more reflective surfaces. As shown in FIG. 6B, the reflective element set 170 is disposed on the transmission path of the laser beam IB penetrating the first wavelength selective element 122. By appropriately disposing the reflective surface(s), the reflective element set 170 allows the laser beam IB to be incident on the first wavelength selective element 122 (for example, the second surface 122S2) at the third angle θ3 smaller than the second angle θ2, and allows the laser beam IB to be reflected by the second surface 122S2 of the first wavelength selective element 122. As shown in FIG. 6B, the filter module 140 is disposed on the transmission path of the laser beam IB incident on the first wavelength selective element 122 at the third angle θ3 and reflected by the first wavelength selective element 122. Next, the laser beam IB reflected by the first wavelength selective element 122 is transmitted to the filter module 140 and the light homogenizing element 150. In the second mode of the illumination device 100B as shown in FIG. 6B, the light homogenizing element 150 outputs the laser beam IB to the light valve 200 of the projection device 10.

Figure 7A:
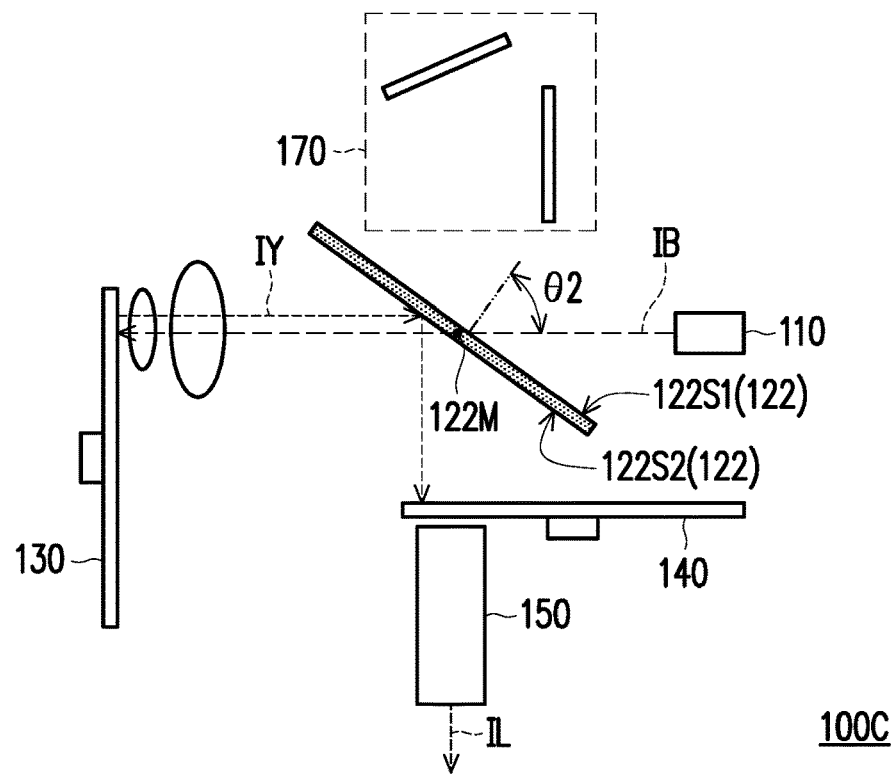
FIGS. 7A and 7B are schematic views of aspects of an illumination device in different modes according to another embodiment of the disclosure.
Figure 7B:
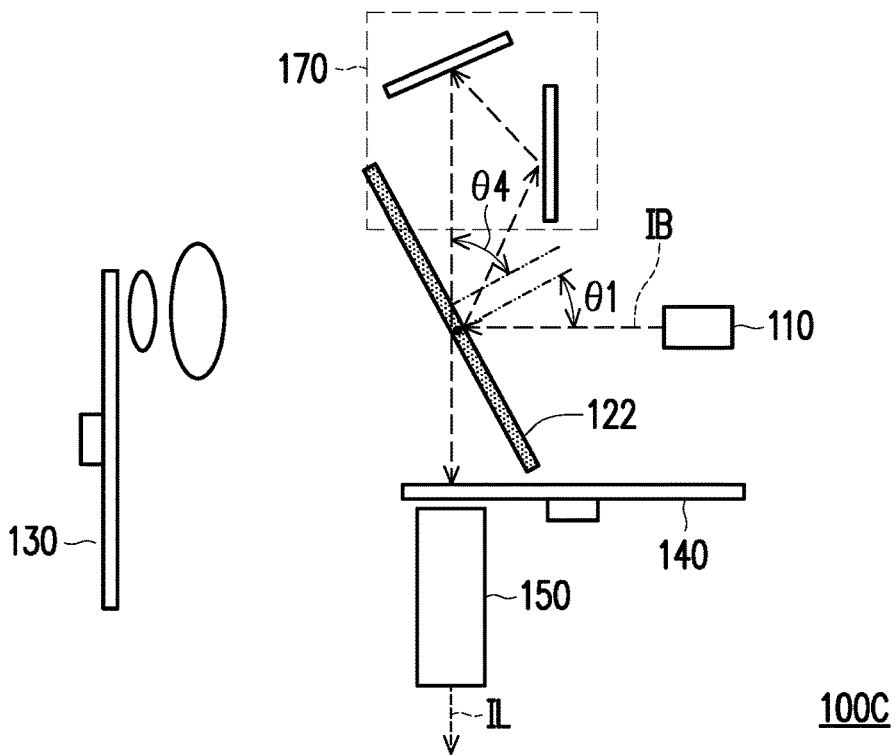

FIGS. 7A and 7B are schematic views of aspects of an illumination device 100C in different modes according to another embodiment of the disclosure. FIG. 7A shows the aspect of the illumination device 100C in the first mode. FIG. 7B shows the aspect of the illumination device 100C in the second mode. Referring to FIG. 7A, the illumination device 100C of the embodiment in FIGS. 7A and 7B is similar to the illumination device 100B in FIGS. 6A and 6B, and the differences are as follows.

The first wavelength selective element 122 of the illumination device 100C may include the first surface 122S1 where the laser beam IB is incident and the second surface 122S2 opposite to the first surface 122S1. The second surface 122S2 of the first wavelength selective element 122 is used to reflect the first converted light beam IY. Such features of the first wavelength selective element 122 may be achieved by using methods known to those skilled in the art, such as coating the surface of the first wavelength selective element 122.

In the first mode of the illumination device 100C, the laser beam IB is incident on the first wavelength selective element 122 at the second angle θ2, so that the laser beam IB penetrates the first wavelength selective element 122 (the transmittance is greater than 50%). As shown in FIG. 7A, the wavelength conversion element 130 is disposed on the transmission path of the laser beam IB penetrating the first wavelength selective element 122.

The wavelength conversion element 130 converts the laser beam IB into the first converted light beam IY. As shown in FIG. 7A, the first converted light beam IY from the wavelength conversion element 130 may be reflected by the second surface 122S2 of the first wavelength selective element 122 to be transmitted to the filter module 140 and the light homogenizing element 150. In the first mode of the illumination device 100C as shown in FIG. 7A, the light homogenizing element 150 outputs the first converted light beam IY to the light valve 200 of the projection device 10.

In the second mode of the illumination device 100C, the laser beam IB is incident on the first wavelength selective element 122 at the first angle θ1, so that the laser beam IB is reflected by the first surface 122S1 of the first wavelength selective element 122 (the reflection ratio is greater than 50%). The reflective element set 170 is disposed on the transmission path of the laser beam IB reflected by the first wavelength selective element 122. By appropriately disposing the reflective surface(s), the reflective element set 170 allows the laser beam IB to be incident on the first wavelength selective element 122 at the fourth angle θ4 greater than the first angle θ1, so that the laser beam IB penetrates the first wavelength selective element 122. The filter module 140 is disposed on the transmission path of the laser beam IB incident on the first wavelength selective element 122 at the fourth angle θ4 and penetrating the first wavelength selective element 122. Next, the laser beam IB is transmitted to the filter module 140 and the light homogenizing element 150. In the second mode of the illumination device 100C as shown in FIG. 7B, the light homogenizing element 150 outputs the laser beam IB to the light valve 200 of the projection device 10.

In sum, in the illumination device and the projection device of the disclosure, by appropriately designing the optical properties of the first wavelength selective element and allowing the laser beam to be incident on the first wavelength selective element at different angles in different modes, the laser beam may be controlled to respectively penetrate the first wavelength selective element or be reflected by the first wavelength selective element. Accordingly, the laser beam or the first converted light beam converted by the wavelength conversion element may be output in different modes, and the illumination beam formed by different colored lights according to the modes may be obtained without a polarization splitting prism needed, thereby reducing costs and device volume. In addition, the first converted light beam obtained in the illumination device and projection device of the disclosure, compared with in other architectures, may have better uniformity and layout. In addition, in the illumination device and the projection device of the disclosure, a reflection area is not required to be disposed on the wavelength conversion element, thereby achieving a simpler structure which is easier to assemble and facilitating heat dissipation.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination device, wherein the illumination device comprises a laser light source, a first wavelength selective element, and a wavelength conversion element, wherein:
    the laser light source is used to provide a laser beam;
    the first wavelength selective element is disposed on a transmission path of the laser beam, and the first wavelength selective element has different transmittances for the laser beam incident at different angles; wherein in a first mode of the illumination device, the laser beam is incident on the first wavelength selective element at a first angle, and the laser beam is reflected by the first wavelength selective element; in a second mode of the illumination device, the laser beam is incident on the first wavelength selective element at a second angle greater than the first angle, and the laser beam penetrates the first wavelength selective element; and
    the wavelength conversion element is disposed on the transmission path of the laser beam, and the wavelength conversion element is used to convert the laser beam into a first converted light beam.

2. The illumination device according to claim 1, wherein when the illumination device is switched from the first mode to the second mode, the first wavelength selective element rotates around a first rotating axis.

3. The illumination device according to claim 2, wherein the illumination device further comprises a drive device, the first wavelength selective element is electrically connected to the drive device, and the drive device drives the first wavelength selective element to rotate around the first rotating axis.

4. The illumination device according to claim 2, wherein the illumination device further comprises a second wavelength selective element, the second wavelength selective element is used to allow the laser beam to pass through, and the second wavelength selective element and the first wavelength selective element rotate around the first rotating axis together.

5. The illumination device according to claim 4, wherein the wavelength conversion element is disposed on the transmission path of the laser beam, the first wavelength selective element is used to allow the first converted light beam to pass through, and the second wavelength selective element is used to reflect the first converted light beam.

6. The illumination device according to claim 4, wherein the illumination device further comprises a filter module, disposed on the transmission path of the laser beam.

7. The illumination device according to claim 4, wherein the illumination device further comprises a filter module, disposed on the transmission path of the laser beam reflected by the first wavelength selective element.

8. The illumination device according to claim 4, wherein when the illumination device is switched from the first mode to the second mode, an included angle between the first wavelength selective element and the second wavelength selective element is fixed.

9. The illumination device according to claim 1, wherein the illumination device further comprises a reflective element set, disposed on the transmission path of the laser beam penetrating the first wavelength selective element, the reflective element set is disposed to allow the laser beam to be incident on the first wavelength selective element at a third angle smaller than the second angle.

10. The illumination device according to claim 9, wherein the illumination device further comprises a filter module, disposed on the transmission path of the laser beam incident on the first wavelength selective element at the third angle and reflected by the first wavelength selective element.

11. The illumination device according to claim 1, wherein the illumination device further comprises a reflective element set, disposed on the transmission path of the laser beam reflected by the first wavelength selective element, and the reflective element set is disposed to allow the laser beam to be incident on the first wavelength selective element at a fourth angle greater than the first angle.

12. The illumination device according to claim 11, wherein the illumination device further comprises a filter module, disposed on the transmission path of the laser beam incident on the first wavelength selective element at the fourth angle and penetrating the first wavelength selective element.

13. A projection device, wherein the projection device comprises an illumination device, a light valve, and a projection lens, wherein:
    the illumination device is used to provide an illumination beam, and the illumination device comprises a laser light source, a first wavelength selective element, and a wavelength conversion element, wherein:
    the laser light source is used to provide a laser beam;
    the first wavelength selective element is disposed on a transmission path of the laser beam, and the first wavelength selective element has different transmittances for the laser beam incident at different angles; wherein in a first mode of the illumination device, the laser beam is incident on the first wavelength selective element at a first angle, and the laser beam is reflected by the first wavelength selective element; in a second mode of the illumination device, the laser beam is incident on the first wavelength selective element at a second angle greater than the first angle, and the laser beam penetrates the first wavelength selective element; and
    the wavelength conversion element is disposed on the transmission path of the laser beam, and the wavelength conversion element is used to convert the laser beam into a first converted light beam, wherein the illumination beam comprises the laser beam and the first converted light beam;

the light valve is disposed on the transmission path of the illumination beam, and the light valve is used to convert the illumination beam into an image beam; and the projection lens is disposed on a transmission path of the image beam, and the projection lens is used to project the image beam out of the projection device.

14. The projection device according to claim 13, wherein the illumination device further comprises a second wavelength selective element, the second wavelength selective element is used to allow the laser beam to pass through, and the second wavelength selective element and the first wavelength selective element rotate around a first rotating axis together.

15. The projection device according to claim 14, wherein the wavelength conversion element is disposed on the transmission path of the laser beam, and the first wavelength selective element is used to allow the first converted light beam to pass through, and the second wavelength selective element is used to reflect the first converted light beam.

16. The projection device according to claim 13, wherein the illumination device further comprises a reflective element set, disposed on the transmission path of the laser beam penetrating the first wavelength selective element, and the reflective element set is disposed to allow the laser beam to be incident on the first wavelength selective element at a third angle smaller than the second angle, wherein the illumination device further comprises a filter module, disposed on the transmission path of the laser beam incident on the first wavelength selective element at the third angle and reflected by the first wavelength selective element.

* * * * *